US010429090B2

(12) United States Patent
  Usilton (10) Patent No.: US 10,429,090 B2
(45) Date of Patent: Oct. 1, 2019

(54) CLOSED-LOOP AIR-TO-WATER AIR CONDITIONING SYSTEM

(71) Applicant: Willis Lewin Usilton, Fort Lauderdale, FL (US)

(72) Inventor: Willis Lewin Usilton, Fort Lauderdale, FL (US)

( * ) Notice: Subject to any disclaimer, the term of this patent is extended or adjusted under 35 U.S.C. 154(b) by 0 days.

(21) Appl. No.: 15/786,705

(22) Filed: Oct. 18, 2017

(65) Prior Publication Data
  US 2019/0113245 A1    Apr. 18, 2019

(51) Int. Cl.
  *F24F 3/06*  (2006.01)
  *F24F 12/00* (2006.01)
  *F17C 1/00*  (2006.01)
  *F24F 5/00*  (2006.01)

(52) U.S. Cl.
  CPC .......... *F24F 3/06* (2013.01); *F17C 1/007* (2013.01); *F24F 5/0017* (2013.01); *F24F 12/002* (2013.01); *F17C 2270/07* (2013.01); *F24F 2005/0057* (2013.01)

(58) Field of Classification Search
  CPC ..... F17C 1/007; F17C 2270/07; F24F 12/002; F24F 3/06; F24F 3/001; F24F 5/0046; F24F 5/0021; F24F 2005/0025; F25B 29/003; F25B 2400/24; F25B 2313/02731; F25B 2313/002; F28D 20/0052
  See application file for complete search history.

(56) References Cited

U.S. PATENT DOCUMENTS

| | | | | |
|---|---|---|---|---|
| 4,407,142 A | * | 10/1983 | O'Reilly | F24D 17/02 62/238.6 |
| 6,178,770 B1 | * | 1/2001 | Bradley, Jr. | F24F 5/0017 165/172 |
| 9,989,271 B1 | * | 6/2018 | Becker | F24F 5/0021 |

(Continued)

FOREIGN PATENT DOCUMENTS

JP    2006-284083    * 10/2006

OTHER PUBLICATIONS

"Machine Translation of JP 2006-284083, Yano et al., Oct. 2006.".*

*Primary Examiner* — Frantz F Jules
*Assistant Examiner* — Martha Tadesse
(74) *Attorney, Agent, or Firm* — The Concept Law Group, PA; Scott D. Smiley; Scott M. Garrett (57) ABSTRACT

An air conditioning system including a condenser system and a closed-loop air-to-water system. The condenser system includes a compressor which pressurizes refrigerant and distributes the pressurized refrigerant to at least one condenser coil, which climatizes water; and a fan which exhausts heat from the pressurized refrigerant. The closed-loop air-to-water system includes a climatized liquid tank, which receives climatized water from the at least one condenser coil; and an air handler disposed within a building, the air handler having a climatized liquid coil. The air handler is disposed to receive air from inside the building; transfer thermal energy from the climatized liquid coil to ambient air, creating climatized air; and distribute the climatized air to at least a portion of the building. The climatized water may be distributed to a recycled liquid tank, which may redistribute the climatized water to the climatized liquid tank, forming a closed-loop air-to-water system.

17 Claims, 5 Drawing Sheets

(56) References Cited

U.S. PATENT DOCUMENTS

| | | | |
|---|---|---|---|
| 2006/0070385 A1* | 4/2006 | Narayanamurthy | F24F 5/0017 62/59 |
| 2008/0022713 A1* | 1/2008 | Jacobi | F24F 5/0017 62/434 |
| 2011/0048037 A1* | 3/2011 | Graslund | F24F 5/0017 62/79 |
| 2016/0076821 A1* | 3/2016 | Kopko | F25B 7/00 165/10 |
| 2016/0187013 A1* | 6/2016 | Becker | F25B 7/00 62/99 |

* cited by examiner

CLOSED-LOOP AIR-TO-WATER AIR CONDITIONING SYSTEM

FIELD OF THE INVENTION

The present invention relates generally to air-to-water air conditioning units and, more particularly, relates to a closed-loop air-to-water air conditioning system for use in a land-based building, such as a home, school, office, factory, or the like.

BACKGROUND OF THE INVENTION

Typical air conditioning units installed in land-based buildings, such as homes, schools, or offices, include several standard components: an interior air handler, including evaporator coils and a fan; an exterior condensing unit, including a condensing coil, a compressor, and a fan; and an expansion valve located between the interior air handler and the exterior compressor unit. In general, an interior air handler and an exterior condensing unit work in conjunction by cycling refrigerant throughout the system and changing the state of the refrigerant from liquid to gas, thereby cooling the interior of the building, and exhausting heat outside of the building. These systems may be referred to as "air-to-air" systems because, inside the building, air is blown over serpentine coils of refrigerant to remove/distribute cold air inside the building and, outside the building, air is blown over another set of coils of the same refrigerant to remove heat therefrom.

When an air conditioning system turns on, the interior air handler draws warm ambient air from inside of the building through an air chamber within the air handler. The air passes through a filter to remove impurities, such as dust, and then passes over serpentine evaporator coils, which are filled with cold, compressed, liquid refrigerant. The refrigerant inside the coils absorbs heat as it changes from a liquid to a gaseous state. The cooled air is then exhausted through air ducts throughout the building, thereby cooling individual rooms therein. The warm refrigerant located within the evaporator coils, which is now a gas, is then pumped by the compressor to the exterior condensing unit. When the exterior condensing unit receives the warm, expanded, gaseous refrigerant, the compressor functions to compress the refrigerant, increasing the refrigerant's pressure and significantly increasing its temperature. Simultaneously, a fan located in the exterior condensing unit draws air into the unit, blowing the air over the refrigerant, now located within the condensing coil, thereby cooling the refrigerant and exhausting the heat dissipated by the refrigerant. When the refrigerant cools, it becomes a compressed liquid, which is then pumped back to the interior air handler, and the cycle continues in order to cool the building. During cold weather, an air-to-air system can be reversed to provide heat to the interior of a building.

As opposed to air-to-air systems typically employed in land-based buildings, traditional marine air conditioning systems function quite differently. This is partly out of out of necessity and partly out of resourcefulness. Unlike a house or other building with plenty of room in the attic to run ductwork, space in marine vessels is at a premium. There is usually no room to run large air ducts to carry a large volume of cold air from room to room. For this reason, marine systems generally channel small tubes of cold water around the vessel. In each room, the coils are exposed and air is blown over them, thereby cooling the air and, in turn, the room. The closed system returns the water back to an area where the water is chilled again and the cycle restarts. More specifically, in marine based systems, lines of refrigerant, like the ones described above that would be used to cool a building, are, in marine applications, only used to cool the closed-loop supply of water that runs throughout the boat.

In addition, marine-based air conditioning systems also differ from land-based air conditioning systems because, in marine systems, water, as opposed to air, is used to absorb heat generated by pressurizing refrigerant. To do this, marine vessels take advantage of the cooling medium they rest upon. More specifically, marine systems utilize similar components to that of land-based systems, including a compressor, coils, expansion valve, and fans; however, marine systems use sea or lake water, which is typically drawn into the system from the water source upon which the vessel rests. This relatively cool water is pulled into the vessel, passed over the hot coils, and exhausted back out of the vessel.

Traditional building-based air conditioning units suffer from a number of drawbacks, namely that they consume a high amount of energy, generate a large amount of heat, and circulate long lines of hazardous refrigerant—requiring large volumes of refrigerant within the lines—into and out of a building. While marine-based systems have some advantages, such as shorter lines of refrigerant, these traditional water-based air conditioning units require an external water source for cooling, invariably leading to losses in efficiency. Further, the water used in marine air conditioning units for cooling is typically seawater and requires maintenance.

Therefore, a need exists to overcome the problems with the prior art as discussed above.

SUMMARY OF THE INVENTION

The invention provides a closed-loop air-to-water air conditioning system that overcomes the hereinafore-mentioned disadvantages of the heretofore-known devices and methods of this general type and that provides a closed-loop system for the storage and circulation of climatized water to selectively heat or cool at least a portion of a building.

With the foregoing and other objects in view, there is provided, in accordance with the invention, a closed-loop air-to-water air conditioning system for providing heating and cooling to a building, where the air conditioning system includes a condenser assembly operably configured to create a non-ambient temperature inside a condenser refrigerant line, a fluid climatization assembly thermally coupled to the condenser assembly, the fluid climatization assembly including a climatized-fluid storage tank, to-be-recycled-climatized-fluid storage tank fluidically coupled to the climatized-fluid storage tank, a first thermal fluid line thermally coupling the climatized-fluid storage tank to the condenser refrigerant line, and a second thermal fluid line fluidically coupled to the climatized-fluid storage tank. Additionally, an air handler assembly is thermally coupled to the second thermal fluid line of the fluid climatization assembly, the air handler assembly having a fan and an air chamber that, together, are operable to move ambient air from within a building across the second thermal fluid line of the fluid climatization assembly to transform the ambient air within the building to climatized air and distribute the climatized air to at least a portion of the building.

In further embodiment, the second thermal fluid line returns from the air handler assembly to the to-be-recycled-climatized-fluid storage tank.

In yet another embodiment of the present invention, the fluid climatization assembly is thermally coupled to the condenser assembly at a thermal mixing block in which heat is transferred from the first thermal fluid line of the fluid climatization assembly to the condenser refrigerant line of the condenser assembly.

In an additional embodiment, the fluid line runs thought the first thermal fluid line from the to-be-recycled-climatized-fluid storage tank, through the thermal mixing block, and returns to the climatized-fluid storage tank.

Some embodiments of the present invention provide the to-be-recycled-climatized-fluid storage tank fluidically coupled to the climatized-fluid storage tank via a crossover tube that is connected to the climatized-fluid storage tank at an upper portion of the climatized-fluid storage tank.

In yet another embodiment of the present invention, the closed-loop air-to-water air conditioning system further includes a temperature detector configured to detect a temperature of fluid in the climatized-fluid storage tank or the to-be-recycled-climatized-fluid storage tank, and control movement of fluid through the fluid line based on a threshold temperature.

The closed-loop air-to-water air conditioning system, according to embodiments of the present invention, also includes a pump in line in the second thermal fluid line and a thermostat in the building, where the pump is configured to be responsive to the thermostat to maintain a temperature in the building.

In accordance with a further feature of the present invention, the climatized-fluid storage tank and the to-be-recycled climatized-fluid storage tank are both insulated.

In accordance with a further feature of the present invention, the climatized-fluid storage tank and the to-be-recycled climatized-fluid storage tank are both buried in the ground.

In accordance with the present invention, an air conditioning system includes: a fluid climatization assembly including a climatized-fluid storage tank and a to-be-recycled-climatized-fluid storage tank. The air conditioning system also includes a condenser assembly configured to pressurize a heated depressurized refrigerant in a condenser refrigerant line to provide a pressurized refrigerant, and to remove heat from the pressurized refrigerant to provide cooled pressurized refrigerant. The air conditioning system also includes an air handler assembly having a fan and an air chamber that, together, are operable to move ambient air from within a building. The air conditioning system also includes a thermal mixing block operably coupled to the condenser assembly via the condenser refrigerant line, where the cooled pressurized refrigerant is depressurized to provide chilled depressurized refrigerant, the thermal mixing block further operably coupled to the to-be-recycled-climatized-fluid storage tank via a first thermal fluid line, where the refrigerant line and first thermal fluid line are in thermal contact, and where heat is transferred from the first thermal fluid line into the refrigerant line, thereby heating the cooled depressurized refrigerant to produce the heated depressurized refrigerant, and further thereby producing chilled fluid in the first thermal fluid line which is provided into the climatized-fluid storage tank. The air conditioning system also includes a second thermal fluid line operably connecting the climatized-fluid storage tank to the air handler assembly thereby providing the chilled fluid to the air handler assembly, where the fan moves the ambient air across the second thermal fluid line to chill the ambient air thereby warming the chilled fluid in the second thermal line to provide warmed fluid that is returned to the to-be-recycled-climatized-fluid storage tank.

In accordance with the present invention, a method of operating a closed-loop air-to-water air conditioning system includes the steps of transferring heat between a refrigerant in a condenser assembly and a non-climatized fluid in a fluid climatization assembly to produce climatized fluid, storing the climatized fluid in a climatized-fluid storage tank; and providing the climatized fluid to the air handler assembly wherein heat is exchanged between the climatized fluid and air inside the building by the air handler assembly, wherein the climatized fluid thereby become the non-climatized fluid and is returned to the fluid climatization assembly.

In accordance with a further feature of the present invention, the climatized fluid is returned to a to-be-recycled-climatized-fluid storage tank that is fluidically coupled to the climatized-fluid storage tank.

Although the invention is illustrated and described herein as embodied in a closed-loop air-to-water air conditioning system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the climatized liquid tank along the base of the climatized liquid tank.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient air conditioning system operably configured to provide heating and cooling to a building without the need to circulate long lines of pressurized, which is prone to leaking, throughout the building, as is required in currently-available air conditioning systems. Instead, embodiments of the invention provide a closed-loop "air-to-water" system that climatizes, stores, and circulates fluid, such as water or other types of liquid refrigerant, between storage tanks and an air handler located within a building. Subsequently, air within the building is climatized in the air handler by removing thermal energy with the climatized water. The cold climatized air is then distributed throughout the building. As used herein, "climatized" means cooled to a temperature that is below an ambient temperature, or heated to a temperature that is above an ambient temperature. For example, if the ambient temperature of water in the closed-loop air-to-water system is 75°, and the water is cooled to a temperature of 55°, the 55° water may be referred to as "climatized water." Similarly, if the ambient temperature of water in the closed-loop air-to-water system is 60°, and the water is heated to a temperature of 70°, the 70° water may be referred to as "climatized water." The same principles and definitions apply to "climatized air," meaning air that has been cooled or heated to a temperature that is different from that of the ambient temperature, such that the climatized air may be distributed to a building to either heat or cool the building.

Figure 1:
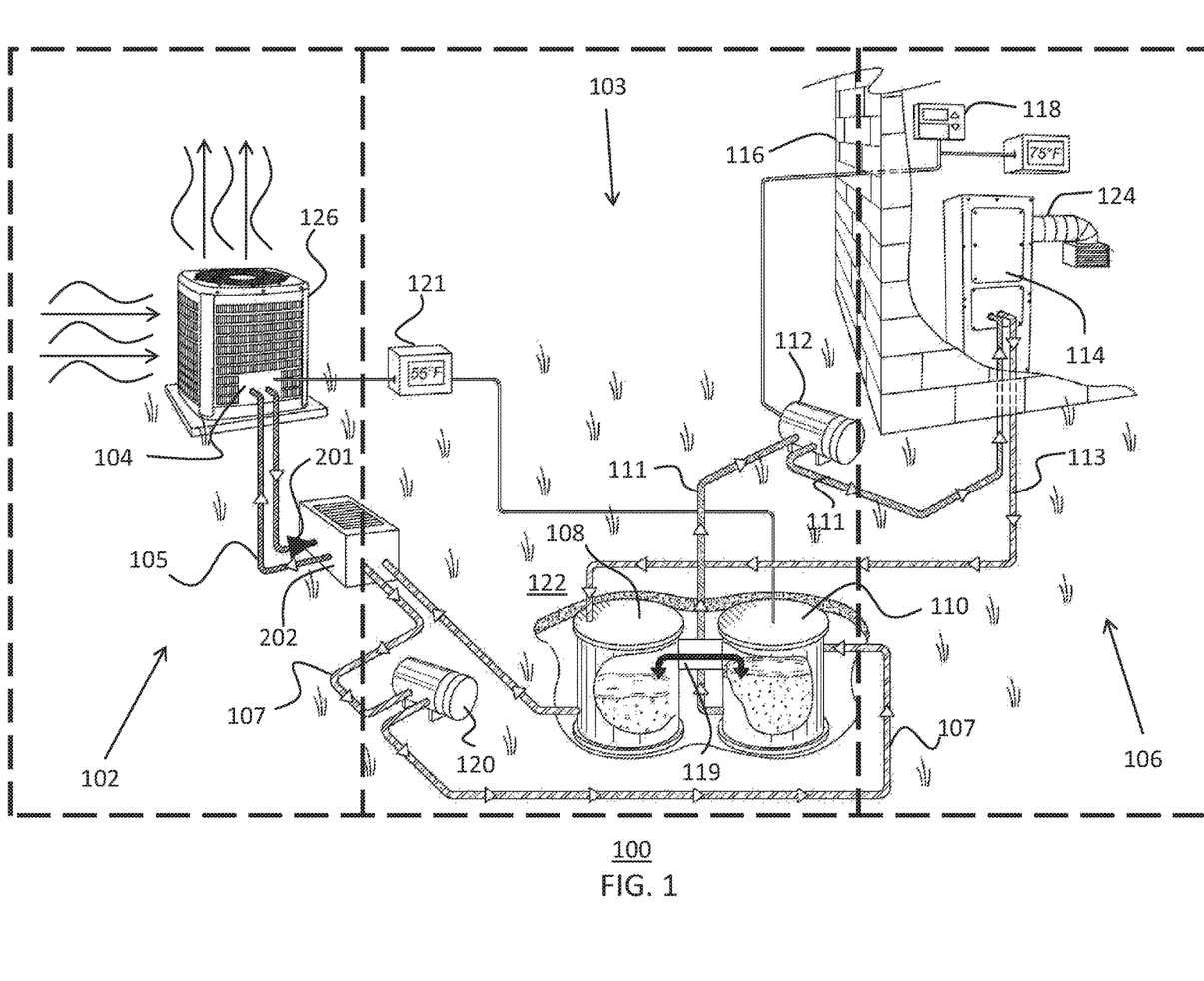
FIG. 1 is a perspective view of a closed-loop air-to-water air conditioning system in accordance with the present invention.

Referring now to FIG. 1, one embodiment of the present invention is shown in a perspective view. FIG. 1 shows several advantageous features of the present invention, but, as will be described below, the invention can be provided in several shapes, sizes, combinations of features and components, and varying numbers and functions of the components. The first example of a closed-loop air-to-water system 100, as shown in FIG. 1, includes a condenser assembly 102, a water climatization assembly 103, and an air handler assembly 106 within a building 116. FIG. 1 provides dashed lines generally indicating where each of the three assemblies could be thought to be separated from the other. The lines are imaginary and for reference only. In practice, because the three assemblies are connected and interoperate, some components, such as lines and pumps, among others, are shared between and could be considered to be a part of more than one of the three main assemblies shown and described herein.

Referring still to FIG. 1, in one embodiment, the closed-loop air-to-water system 100 includes a condenser assembly 102 located outside or at least able to exhaust air outside of a building. As used herein, "building" means a stationary structure, such as a home, office, school, cabin, or other structure that provides an interior shelter from an exterior environment. FIG. 1 shows one such building, labeled as 116. The condenser assembly 102 may include a compressor 104 (the details of which are known in the art and not shown here in detail), which may be located within a condenser fan tower 126, or which may form a separate structure from the condenser fan tower 126. Similar to prior-art air conditioning systems, the compressor 104 may be operably configured to compress or pressurize fluid, such as refrigerant, thereby creating a high-pressure and high-temperature refrigerant (e.g. pressurized refrigerant) within a refrigerant line 105.

Figure 2:
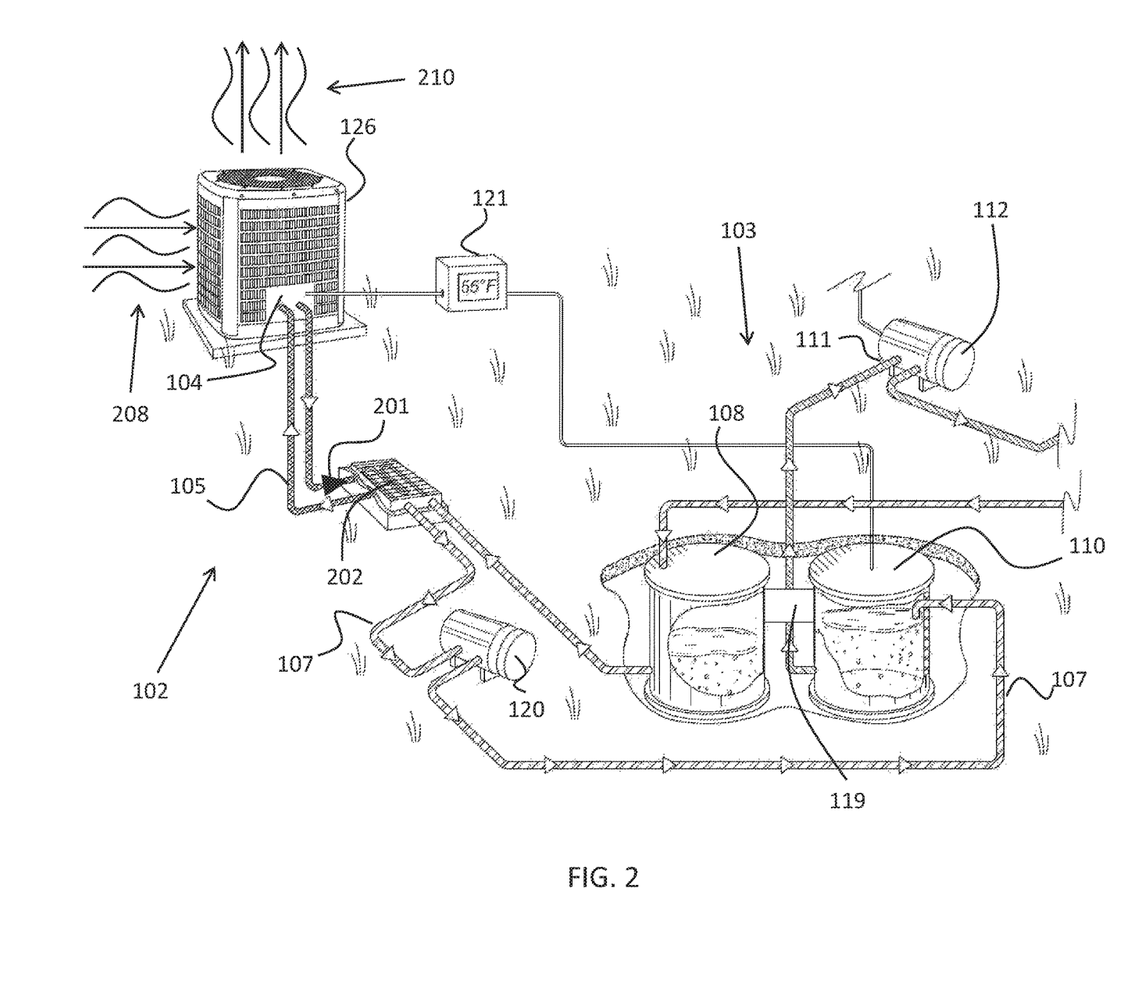
FIG. 2 is a perspective view of the condenser assembly and water climatization assemblies of FIG. 1, with cutaway views of the condenser coil, the climatized-fluid storage tank, and the recycled climatized-fluid storage tank, in accordance with the present invention.

Referring now to FIG. 2, the pressurized refrigerant may then be transferred from the compressor 104 to at least one condenser coil, which may be located within the condenser fan tower 126, or which may be separate from the condenser fan tower 126. When the pressurized refrigerant passes through the at least one condenser coil, ambient air 208 may simultaneously enter the condenser fan tower 126 and absorb heat from the pressurized refrigerant by passing over the at least one condenser coil, thereby removing heat from the pressurized refrigerant and producing cooled pressurized refrigerant. The condenser fan tower 126 may then exhaust the warmer air 210 into the ambient environment surrounding the condenser fan tower 126, similar to traditional land-based air conditioning systems, but different from traditional marine-based air conditioning systems, which require water to absorb the heat generated by pressurizing refrigerant. In the process, the refrigerant within the at least one condenser coil may then be compressed, turned into a liquid, and then cooled. In accordance with the invention, this cooled pressurized refrigerant is pumped through condenser refrigerant line 105 to a thermal mixing block 202, where it is utilized to cool a cooling medium, as will be explained below, but generally the pressurized refrigerant is depressurized with a thermal expansion valve 201, thereby lower its temperature significantly. Once the depressurized refrigerant leaves the thermal mixing block 202, it returns to the condenser fan tower 126 to start the compressing/cooling process over again.

Referring again to FIG. 1, the water climatization assembly 103 includes at least one thermally insulated climatized-fluid storage tank 110 coupled to a fluid pipe 107 that runs next to and is thermally coupled to the thermal mixing block 202. In one embodiment, water within the water climatization assembly 103 circulates in physical/thermal contact with the refrigerant within the condenser refrigerant line 105 within the thermal mixing block 202, thereby acclimatizing the water. That is, the water going to the thermal mixing block can be considered to be non-climatized water or fluid. For example, the water of the water climatization assembly 103 may become cooler as it transfers heat to the cooled depressurized refrigerant within the condenser refrigerant line 105 in thermal mixing block 202. In one embodiment, the thermal mixing block 202 may be a structure that includes an expansion valve to allow the pressurized refrigerant to depressurize, providing chilled depressurized refrigerant in thermal mixing block 202. The thermal mixing block 202 places the condenser refrigerant line 105, with the depressurized chilled refrigerant, and the fluid pipe 107 in a coaxial arrangement so that the fluid within the fluid pipe 107 passes or flows around all sides of the condenser refrigerant line 105 for a distance, thereby maximizing the exterior surface area of the condenser refrigerant line 105 for thermal contact with the fluid within the fluid pipe 107. In another embodiment, chilled refrigerant within condenser refrigerant line 105 passes or flows around all sides of the fluid pipe 107 for a distance, thereby maximizing the exterior surface area of the fluid pipe for thermal contact with the refrigerant within the condenser refrigerant line 105. Thus chilled depressurized refrigerant becomes heated depressurized refrigerant upon heat transferring from the water line 107 to the refrigerant line 105, The heated depressurized refrigerant is returned to the compressor 104 in the condenser fan tower 126 in an ongoing process, as needed. Generally, in summary, the condenser coil, having received the pressurized refrigerant from the compressor 104, may transfer thermal energy (i.e. heat) with water (or other fluid) within the fluid pipe 107 to create climatized water for distribution through the air handler assembly 106.

The cold or chilled water exits the thermal block 202 and travels through fluid pipe 107 to a pump 120. The pump 120 pushes the cold water onwards through the fluid pipe 107 and into a climatized-fluid storage tank 110. Ideally, the climatized-fluid storage tank 110 is thermally insulated and will maintain the cold temperature of the water for a long amount of time, preferably hours, if not days. Therefore, chilled water can remain at its chilled temperature within the climatized-fluid storage tank 110 when the system is not in use. The climatized-fluid storage tank 110 may be disposed beneath a ground surface 122, as shown in FIG. 1, which may provide insulation for the climatized-fluid tank 110. Of course, the climatized-fluid storage tank 110 may also be disposed above the ground surface 122. In some embodiments climatized-fluid storage tank 110 may be constructed like a DEWAR tank, with inner and outer walls and a vacuum separation between the walls, where the inner wall forms a tank in which the chilled water is stored.

The climatized-fluid storage tank 110 has two exit ports—a water pipe 111 and crossover tube 119. Under ideal operation, the cold water inside of the climatized-fluid storage tank 110 is removed from the climatized-fluid storage tank 110 by a water pump 112 disposed downstream from the climatized-fluid storage tank 110 that places a vacuum on the water pipe 111. Water pump 112, when operating, pulls water from the climatized-fluid storage tank 110 and sends the cold water downstream through pipe 111 and into the air handler assembly 106. In one embodiment, the air handler assembly 106 is within the building 116.

Figure 3:
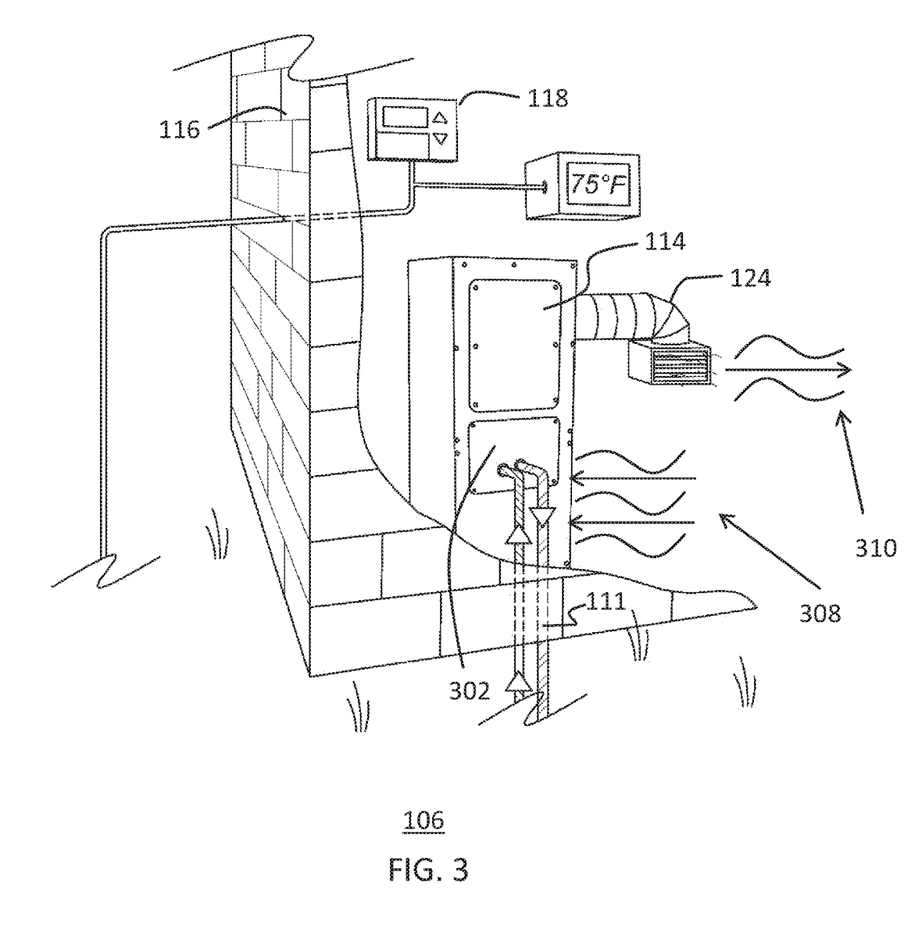
FIG. 3 is a perspective cutaway view of a building showing details of the air handler assembly of FIG. 1, in accordance with the present invention.

Referring now to FIG. 3, an interior portion of the air handler assembly 106 is shown in detail. In one embodiment, the air handler 114 may include a climatized fluid coil 302. In one embodiment, the climatized fluid coil 302 is formed in a serpentine pattern that allows air to pass through said coil. Serpentine coils are known in the art and not shown here in detail. The climatized fluid coil 302 is be fluidly coupled to the climatized-fluid storage tank 110 through the pipe 111. In one embodiment, the climatized fluid coil 302 may be operably configured to receive climatized water stored within the climatized-fluid storage tank 110 and pumped by the pump 112, and may be operably configured to circulate the climatized water throughout the air handler assembly 106.

Still referring to FIG. 3, in one embodiment, the air handler 114 may be disposed to receive ambient air 308 from inside of the building 116. The ambient air 308 may have a temperature which may be referred to as "room temperature." As used herein, "room temperature" means the ambient temperature of at least a portion of the building 116. In one embodiment, when the air handler 114 receives ambient air 308 from inside of the building 116, the ambient air 308 may pass over the climatized fluid coil 302. As such, the climatized fluid coil 302 may be operably configured to transform the ambient air 308 to climatized air 310 by transferring thermal energy from the climatized water flowing through the climatized fluid coil 302 to the ambient air 308. In one embodiment, the climatized air 310 may then be distributed to at least a portion of the building 116 through at least one air duct 124, thereby either cooling or heating the at least a portion of the building 116, depending on the goal of the closed-loop air-to-water system 100. In one embodiment, the programming of the closed-loop air-to-water system 100 may be accomplished through a thermostat 118, which may control the desired temperature of the climatized air 310.

Referring again to FIG. 1, the air handler 114 may be fluidly coupled to a to-be-recycled-climatized-fluid storage tank 108 through return water line 113. In one embodiment, the to-be-recycled-climatized-fluid storage tank 108 may be disposed beneath the ground surface 122, as shown in FIG. 1, which may provide insulation for the recycled-climatized-fluid storage tank 108. In another embodiment, the recycled-climatized-fluid storage tank 108 may be disposed above the ground surface 122. In one embodiment, the recycled-climatized-fluid storage tank 108 may be disposed to receive climatized water from the climatized fluid coil 302 disposed within the air handler 114. Depending on the temperature of the climatized water that is received by the to-be-recycled-climatized-fluid storage tank 108, the to-be-recycled-climatized-fluid storage tank 108 may redistribute the water back into the air handler assembly 106, thereby continuing to climatize the building 116. For example, if the closed-loop air-to-water system 100 is set to "cool," and the climatized water output by the air handler 114 via pipe 113 received by the to-be-recycled-climatized-fluid storage tank 108 is sufficiently cool to effectively cool at least a portion of the building 116, the to-be-recycled-climatized-fluid storage tank 108 may redistribute the climatized water back to the climatized-fluid storage tank 110 through the crossover tube 119, which may flow in either direction between the two tanks 108, 110, depending on the conditions therein. The climatized-fluid storage tank 110 and the to-be-recycled-climatized-fluid storage tank 108 do not necessarily have to be separate structures as shown in FIGS. 1 & 2. In an embodiment of the present invention, the climatized-fluid storage tank 110 and the to-be-recycled-climatized-fluid storage tank 108 can be a single structure with multiple chambers within. Preferably, the chambers would be thermally separated from each other.

Alternatively, if the climatized water received by the to-be-recycled-climatized-fluid storage tank 108 is not sufficiently cool to effectively cool at least a portion of the building 116, the to-be-recycled-climatized-fluid storage tank 108 may distribute that water to the block 202 to become re-climatized, i.e., cooled again. Since the climatized water continues to flow throughout the closed-loop air-to-water system 100, the water portion of the closed-loop air-to-water system 100 may be referred to as a closed-loop system, with minimal water loss throughout the closed-loop air-to-water system 100.

In one embodiment, the to-be-recycled-climatized-fluid storage tank 108 may be in direct fluid communication with the climatized-fluid storage tank 110 at crossover tube 119. In one embodiment, climatized water may flow from the to-be-recycled-climatized-fluid storage tank 108 to the climatized-fluid storage tank 110 through crossover tube 119, in order to redistribute climatized water through the air handler assembly 106 to the air handler 114. In one embodiment, climatized water may flow from the climatized-fluid storage tank 110 to the to-be-recycled-climatized-fluid storage tank 108 through crossover tube 119, in order to store climatized water in the to-be-recycled-climatized-fluid storage tank 108. In some embodiments the crossover tube 119 can be connected to the climatized-fluid storage tank 110 at an upper portion (i.e. above halfway), or at a top, of the climatized-fluid storage tank 110, and can likewise connect to a top portion or top of the to-be-recycled-climatized-fluid storage tank 108.

Pump 112 is coupled to the air handler assembly 106 and may be temperature controlled. In one embodiment, the temperature controlled pump 112 is disposed downstream from the climatized-fluid storage tank 110 and upstream from the air handler 114. When thermostat 118 detects the need to heat or cool the building 116, the pump 112 is engaged, which then pulls climatized water from the climatized-fluid storage tank 110 to the air handler 114. Advantageously, this process can take place without running any component of the condenser assembly 102, thereby saving a great deal of energy in comparison to prior-art cooling systems.

The water inside the climatized-fluid storage tank 110 needs to be at the proper temperature when the temperature controlled pump 112 moves it to the air handler 114. Therefore, the storage tanks 108, 110 may be coupled to a temperature detector 121 that detects the temperature of the climatized water housed within the climatized-fluid storage tank 110. The temperature detector 121 controls the pump 120. In one embodiment, upon reaching a threshold temperature (i.e., above 70° for a cooling system, or below 60° for a warming system), the temperature controlled pump 120 may remove the climatized water from the recycled-climatized-fluid storage tank 108 to be circulated to the thermal block 202 in order to re-climatize the water, and subsequently be re-distributed to the climatized-fluid storage tank 110. In one embodiment, the air handler 114 may include a temperature controlled pump that is operably configured to pump climatized water to the to-be-recycled-climatized-fluid storage tank 108 to be distributed to the thermal block 202 to be re-climatized.

Figure 4:
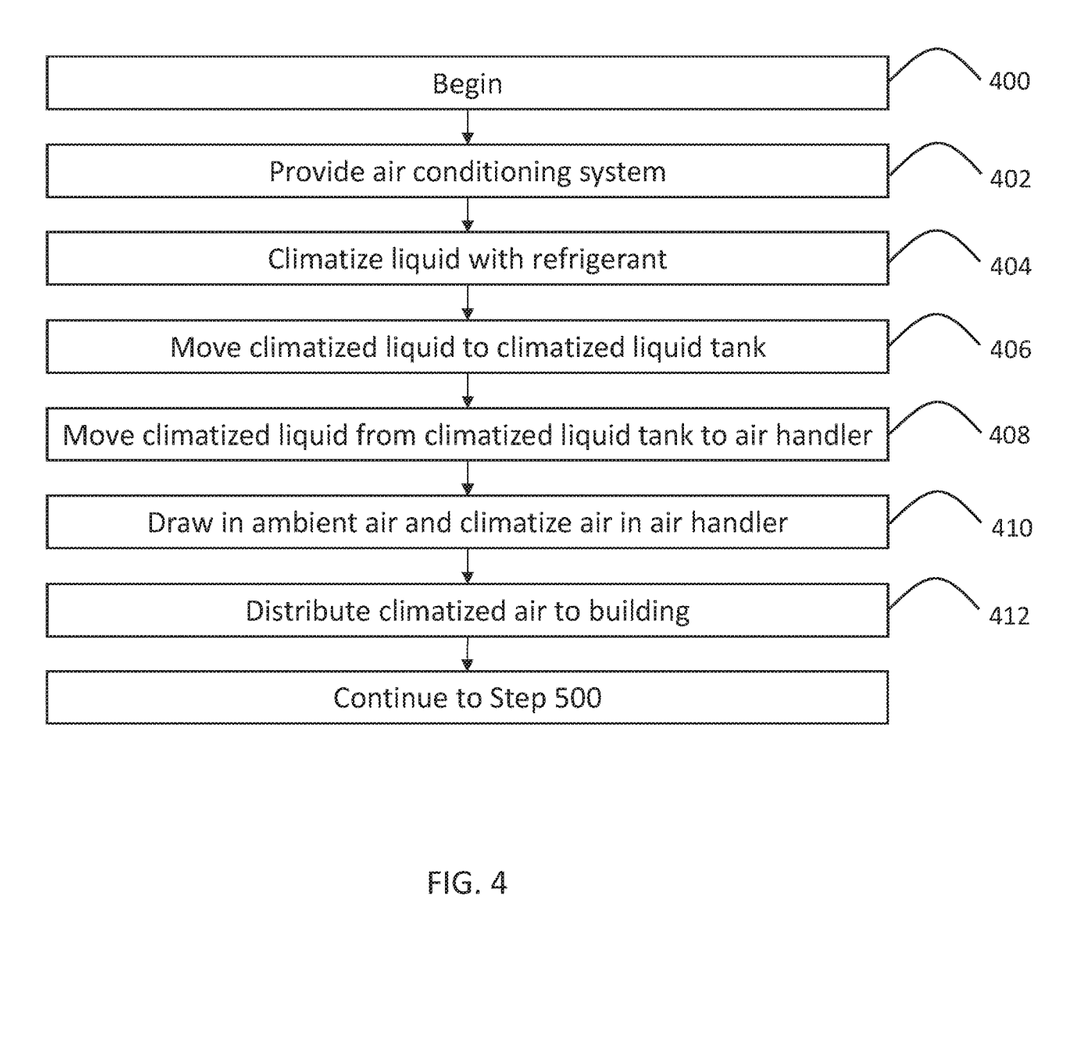
FIGS. 4-5 are flow chart diagrams of a method of selectively cooling or heating a building using the closed-loop air-to-water air conditioning system of FIG. 1, in accordance with the present invention.
Figure 5:
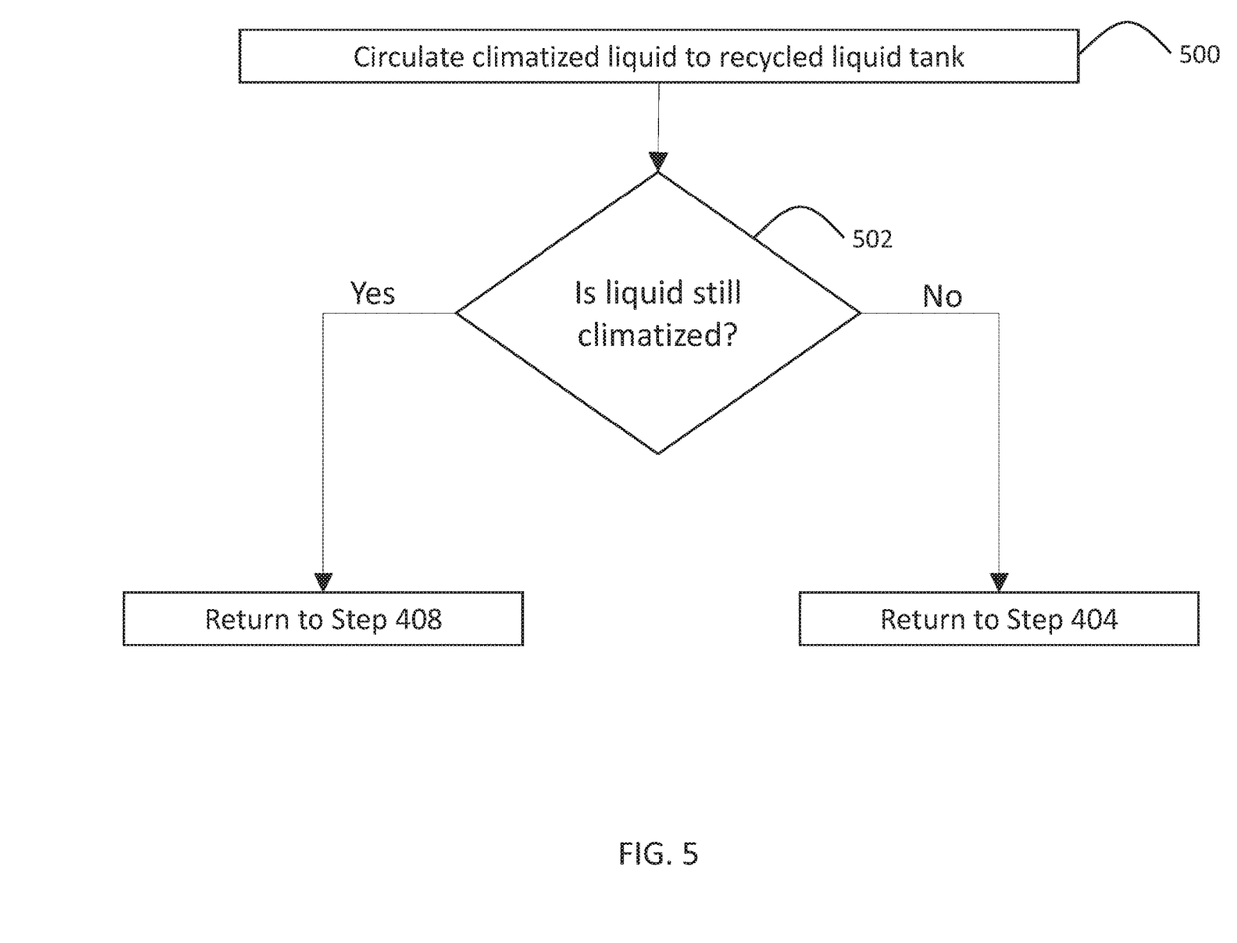

FIGS. 1-3 will be described in conjunction with the process flow chart diagrams of FIGS. 4-5. Although FIGS. 4-5 show a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIGS. 4-5 for the sake of brevity. In some embodiments, some or all of the process steps included in FIGS. 4-5 can be combined into a single process.

Referring now to FIG. 4 in particular, with reference to FIGS. 1-3, a method of providing heating or cooling to a building 116 is described in greater detail. The method may begin at step 400 and proceed directly to step 402, in which the closed-loop air-to-water system 100 is provided with the features and configurations described herein above. The method may then proceed to step 404, which includes pumping refrigerant through the condenser coil 104 and thermal block 202 to climatize the non-climatized water by either cooling the water to a temperature that is below an ambient temperature, or heating the water to a temperature that is above an ambient temperature, depending on the goal of the closed-loop air-to-water system 100. For example, if the closed-loop air-to-water system 100 is programmed to provide cooling to the building 116, the water will be climatized (climatized water/fluid) by the thermal block 202 to a temperature that is below an ambient temperature. Alternatively, if the closed-loop air-to-water system 100 is programmed to provide heating to the building 116, the water will be climatized by the thermal block 202 to a temperature that is above an ambient temperature. The method may then proceed to step 406, in which the climatized water is pumped from the at least one thermal mixing block 202 to the climatized-fluid storage tank 110, where the climatized water may be stored before being distributed through the remainder of the air handler assembly 106.

The method of providing heating or cooling to the building 116 may proceed to step 408, in which the climatized water is pumped from the climatized-fluid storage tank 110 to the air handler 114 disposed in an interior portion of the building 116. During step 408, the climatized water may flow through the climatized fluid coil 302, thereby making the climatized fluid coil 302 either cool in order to cool at least a portion of the building 116, or warm in order to warm at least a portion of the building 116.

The method of providing heating or cooling to the building 116 may then proceed to step 410, in which the air handler 114 may draw ambient air 308 into the air handler 114, passing the ambient air 308 over the climatized fluid coil 302. As such, the ambient air 308 may receive thermal energy from the climatized water flowing through the climatized fluid coil 302 to either cool or heat at least a portion of the building 116. For example, if the closed-loop air-to-water system 100 is programmed to provide cooling to at least a portion of the building 116, the ambient air 308 will become cooler by passing over the cool climatized fluid coil 302. Similarly, if the closed-loop air-to-water system 100 is programmed to provide heating to at least a portion of the building 116, the ambient air 308 will become warmer by passing over the warm climatized fluid coil 302. The climatized air 310 created by passing ambient air 308 over the climatized fluid coil 302 may then be distributed to at least a portion of the building 116 through the at least one air duct 124.

Referring now to FIG. 5, after the climatized water within the climatized fluid coil 302 transfers thermal energy to the ambient air 308 drawn into the air handler 114, the climatized water may no longer be of an optimal temperature to provide at least one of heating and cooling to the building 116. As such, in step 500, the climatized water is pumped from the climatized fluid coil 302 to the to-be-recycled-climatized-fluid storage tank 108, which may be disposed exterior to the building 116. The climatized water may be stored within the recycled-climatized-fluid storage tank 108 for redistribution within the closed-loop air-to-water system 100.

During step 502, a decision is made regarding the use of the climatized water within the recycled-climatized-fluid storage tank 108. In one embodiment, a temperature detector 121 coupled to the recycled-climatized-fluid storage tank 108 may measure the temperature of the climatized water stored within the recycled-climatized-fluid storage tank 108 to determine whether the climatized water may be reused within the closed-loop air-to-water system 100. For example, if the climatized water held within the recycled-climatized-fluid storage tank 108 is sufficiently cool to effectively cool at least a portion of the building 116, the recycled-climatized-fluid storage tank 108 may redistribute the climatized water through the crossover tube 119. Such distribution to the climatized-fluid storage tank 110 occurs during step 504. Upon being received by the climatized-fluid storage tank 110, the climatized water may be redistributed through the closed-loop air-to-water system by repeating steps 408-412 and 500-502.

Alternatively, if the climatized water received by the recycled-climatized-fluid storage tank 110 is not sufficiently cool (or hot, depending on the desired settings) to effectively cool at least a portion of the building 116, the recycled-climatized-fluid storage tank 108 may distribute the climatized water to the thermal block 202 disposed within the condenser assembly 102. Such distribution to the thermal block 202 occurs during step 404 and the re-climatized water may be distributed throughout the air handler assembly 106 by repeating steps 406-412 and 500-502.

An air conditioning system for providing heating and cooling to a building has been disclosed that includes a condenser system which utilizes air to remove heat from pressurized refrigerant, and a closed-loop air-to-water system which stores and circulates climatized water to a building, thereby allowing for the selective heating and/or cooling of the building by transferring thermal energy from the climatized water to ambient air within the building.

What is claimed is:

1. A closed-loop air-to-water air conditioning system for providing heating and cooling to a building, the air conditioning system comprising:
   a condenser assembly operably configured to create a non-ambient temperature inside a condenser refrigerant line;
   a fluid climatization assembly thermally coupled to the condenser assembly, the fluid climatization assembly including:
   a climatized-fluid storage tank;
   a to-recycled-climatized-fluid storage tank fluidically coupled to the climatized-fluid storage tank by a crossover tube configured to allow a fluid to pass from the climatized-fluid storage tank to the to-be-recycled-climatized-fluid storage tank;
   a first thermal fluid line thermally coupling the climatized-fluid storage tank and the to-be-recycled-climatized-fluid storage tank to the condenser refrigerant line, wherein the first thermal fluid line is configured to distribute the fluid from the to-be-recycled-climatized-fluid storage tank to a thermal coupling with the condenser refrigerant line to thereby chill the fluid in the first thermal fluid line and return to the climatized-fluid storage tank; and
   a second thermal fluid line fluidically coupled to the climatized-fluid storage tank; and
   an air handler assembly thermally coupled to the second thermal fluid line of the fluid climatization assembly, the air handler assembly having a fan and an air chamber that, together, are operable to move ambient air from within the building across the second thermal fluid line of the fluid climatization assembly to transform the ambient air within the building to climatized air and distribute the climatized air to at least a portion of the building;
   wherein the second thermal fluid line is routed from the climatized-fluid storage tank, through the air handler assembly, and returns to the to-be-recycled-climatized-fluid storage tank.

2. The closed-loop air-to-water air conditioning system according to claim 1, wherein the fluid climatization assembly is thermally coupled to the condenser assembly at a thermal mixing block in which heat is transferred from the first thermal fluid line of the fluid climatization assembly to the condenser refrigerant line of the condenser assembly.

3. The closed-loop air-to-water air conditioning system according to claim 1, wherein the crossover tube is connected to the climatized-fluid storage tank at an upper portion of the climatized-fluid storage tank.

4. The closed-loop air-to-water air conditioning system according to claim 1, further comprising a temperature detector configured to detect a temperature of fluid in the climatized-fluid storage tank or the to-be-recycled-climatized-fluid storage tank, and control movement of fluid through the first thermal fluid line based on a threshold temperature.

5. The closed-loop air-to-water air conditioning system according to claim 1, further comprising a pump in line in the second thermal fluid line.

6. The closed-loop air-to-water air conditioning system according to claim 5, further comprising a thermostat in the building, wherein the pump is configured to be responsive to the thermostat to maintain a temperature in the building.

7. The closed-loop air-to-water air conditioning system according to claim 1, wherein the climatized-fluid storage tank and the to-be-recycled climatized-fluid storage tank are both insulated.

8. The closed-loop air-to-water air conditioning system according to claim 1, wherein the climatized-fluid storage tank and the to-be-recycled climatized-fluid storage tank are both buried.

9. An air conditioning system, comprising:
   a fluid climatization assembly including a climatized-fluid storage tank and a to-be-recycled-climatized-fluid storage tank fluidically coupled to the climatized-fluid storage tank whereby fluid passes from the fluid climatization tank and the to-be-recycled-climatized-fluid storage tank;
   a condenser assembly configured to pressurize a heated depressurized refrigerant in a condenser refrigerant line to provide a pressurized refrigerant, and to remove heat from the pressurized refrigerant to provide cooled pressurized refrigerant;
   an air handler assembly having a fan and an air chamber that, together, are operable to move ambient air from within a building;
   a thermal mixing block operably coupled to the condenser assembly via the condenser refrigerant line, wherein the cooled pressurized refrigerant is depressurized to provide chilled depressurized refrigerant, the thermal mixing block further operably coupled to the to-berecycled-climatized-fluid storage tank via a first thermal fluid line, wherein the refrigerant line and first thermal fluid line are in thermal contact, and wherein heat is transferred from the first thermal fluid line into the refrigerant line, thereby heating the cooled depressurized refrigerant to produce the heated depressurized refrigerant, and further thereby producing chilled fluid in the first thermal fluid line which is provided into the climatized-fluid storage tank; and a second thermal fluid line operably connecting the climatized-fluid storage tank to the air handler assembly thereby providing the chilled fluid to the air handler assembly, wherein the fan moves the ambient air across the second thermal fluid line to chill the ambient air thereby warming the chilled fluid in the second thermal line to provide warmed fluid that is returned to the to-be-recycled-climatized-fluid storage tank.

10. The air conditioning system of claim 9, wherein the to-be-recycled-climatized-fluid storage tank is fluidically coupled to the climatized-fluid storage tank by a crossover tube coupled between the to-be-recycled-climatized-fluid storage tank and the climatized-fluid storage tank.

11. The air conditioning system of claim 10, wherein the crossover tube is connected to the climatized-fluid storage tank at an upper portion of the climatized-fluid storage tank.

12. The air conditioning system of claim 9, further comprising a temperature detector configured to detect a temperature of fluid in the climatized-fluid storage tank or the to-be-recycled-climatized-fluid storage tank, and control movement of fluid through the first thermal fluid line based on a threshold temperature.

13. The air conditioning system of claim 9, further comprising a pump in line in the second thermal fluid line.

14. The air conditioning system of claim 13, further comprising a thermostat in the building, wherein the pump is configured to be responsive to the thermostat to maintain a temperature in the building.

15. The air conditioning system of claim 9, wherein the climatized-fluid storage tank and the to-be-recycled-climatized-fluid storage tank are both insulated.

16. The air conditioning system of claim 9, wherein the climatized-fluid storage tank and the to-be-recycled-climatized-fluid storage tank are both buried.

17. A method of operating a closed-loop air-to-water air conditioning system for providing heating and cooling to a building, the system including a condenser assembly, a fluid climatization assembly, and an air handler assembly in a building, the method comprising:

cooling a non-climatized fluid of the fluid climatization assembly to produce climatized fluid by transferring heat between the non-climatized fluid and a cooled refrigerant in the condenser assembly;

storing the climatized fluid in a climatized-fluid storage tank; and providing the climatized fluid to the air handler assembly wherein heat is exchanged between the climatized fluid and air inside the building by the air handler assembly, wherein the climatized fluid thereby becomes the non-climatized fluid and is returned to the fluid climatization assembly at a to-be-recycled-climatized-fluid storage tank that is fluidically coupled to the climatized-fluid storage tank such that fluid passes between the climatized-fluid storage tank and the to-be-recycled-climatized-fluid storage tank;

wherein cooling the non-climatized fluid comprises distributing the non-climatized fluid from the to-be-recycled-climatized-fluid storage tank to a thermal coupling with the condenser assembly to produce the climatized fluid provided to the climatized-fluid storage tank.

* * * * *